July 24, 1962     H. C. MABIE     3,045,325
SUPPORT AND REINFORCEMENT STRUCTURE AND METHOD OF FABRICATION
Filed Aug. 16, 1957
FIGURE 1
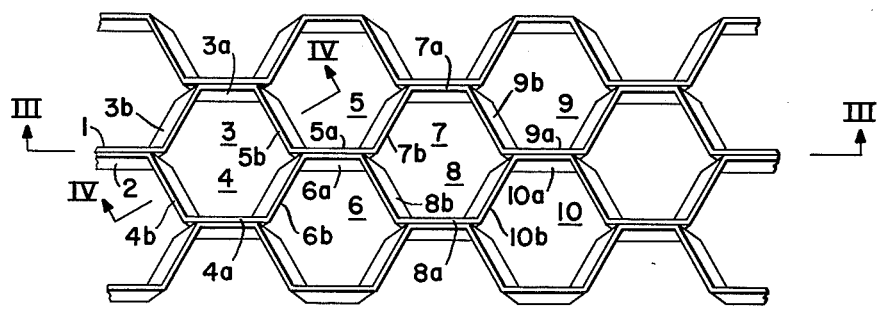
FIGURE 2
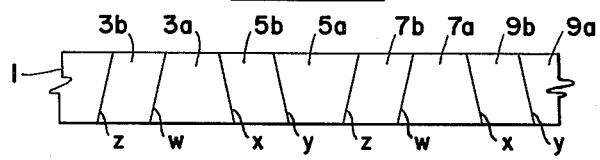
FIGURE 3
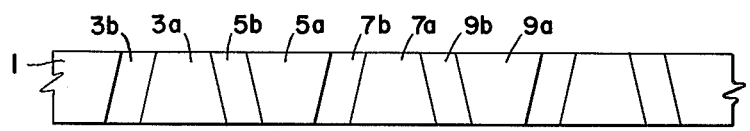
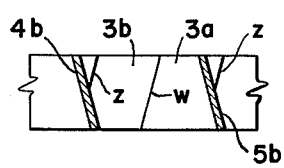
FIGURE 4
Henry C. Mabie     Inventor United States Patent Office 3,045,325
Patented July 24, 1962

3,045,325
SUPPORT AND REINFORCEMENT STRUCTURE
AND METHOD OF FABRICATION
Henry C. Mabie, Plainfield, N.J., assignor to Esso Research and Engineering Company, a corporation of Delaware
Filed Aug. 16, 1957, Ser. No. 678,624
1 Claim. (Cl. 29—155)

The present invention relates to a support and reinforcement structure for cementitious coatings and the like, and to a method for producing such structures and/or their principal component parts. More particularly, this invention relates to such a method and structure as employed to provide support and reinforcement for a coating material used to line and protect the interior surfaces of reaction vessels. Specifically, the invention relates to a support and reinforcement means for cementitious materials employed as linings for container vessels, such as in a fluidized solids process, including linings for catalytic reactor and regenerator vessels, cyclone separators and other similar equipment.

In the services contemplated, various types of cementitious liner materials are employed. One such liner material comprises a mixture of cement and calcined fire clay, and is generally known as a "refractory castable." In most instances some form of metallic reinforcement is required to retain the cementitious liner in effective protective relation to the inner wall surfaces of the container vessel involved. Here again, various types of support and reinforcement structures have been used, including expanded metal, wire mesh, rods and other metallic structural elements. A widely used support and reinforcement means has been a form of metal grating, known as "Hexsteel," which is made up of a plurality of narrow metal strips deformed to provide a longitudinal series of uniform, semi-hexagonal pockets, alternate pockets facing outwardly from opposite sides of the original strips. These strips are then joined in substantially parallel relation, by welding or otherwise, to form a grating structure in which, by opposed arrangement of pockets in adjoining strips, a series of parallel rows of hexagonal cells are provided to receive and retain a cementitious liner or filler applied thereto.

Reinforcement structures of this type have proved deficient for two principal reasons. First, most cementitious liner materials tend to shrink as they set. This results in separation of the liner material from the support structure. Secondly, the employment of cementitious liners, and the support structures therefor, usually is in equipment subject to vibration of one sort or another. These conditions are apt to produce dislodgement of the cementitious liner material from the pockets or cells provided by a hexagonal cell grating structure of the type contemplated.

It is an object of the present invention to provide a reinforcement structure whereby the effects of shrinkage and vibration are minimized or substantially overcome. Further, it is an object of the present invention to provide a support and reinforcement structure adapted to perform its essential functions with a minimum of separation or dislodgement of an applied cementitious liner material as a result of shrinkage of such material, or the incidents of service in which the liner material or reinforcement are employed.

The invention and its objects may be more fully understood from the following description, when it is read with reference to the accompanying drawings, of which:

FIG. 1 is a plan view of a portion of a grating structure such as is contemplated by the present invention;

FIG. 2 is a view in elevation of a portion of a strip element from which a grating strip is produced by deformation along the lines of definition indicated;

FIG. 3 is a view in elevation of a section of the structure of FIG. 1, taken along the line III—III thereof;

FIG. 4 is a similar view, taken along the line IV—IV of FIG. 1.

Referring first to FIG. 1, the numerals 1 and 2 designate two adjoining elements of a series of elements which have been preformed and then joined to form a cellular grating structure adapted to reinforce and support a cementitious material applied so as to fill the cells defined by the walled openings in such grating structure. Each of such elements is deformed to provide a longitudinal series of walled pockets, generally indicated by the numerals 3, 5, 7, and 9, and 4, 6, 8, and 10 respectively. In each element, the several pockets are disposed in alternate, oppositely facing serial relation along the longitudinal axis of the grating strip from which the element is formed. Each pocket includes a bottom wall portion substantially aligned with such axis, and in parallel relation thereto, and at least two side wall portions, each joined to respective ends of said bottom wall portion in angular relation to said bottom wall portion, and to the longitudinal axis of said grating strip elements. These angularly disposed side wall portions, as shown, are each common to successive and adjoining pockets of the series of pockets.

In FIG. 1, the pocket bottom wall portions are designated respectively by the numerals 3a, 5a, 7a, 9a, and 4a, 6a, 8a, 10a while the side wall portions are designated by the numerals 3b, 5b, 7b, 9b and 4b, 6b, 8b, 10b. In the structure as illustrated, each of the pockets thus defined is substantially a one half section of a hexagon divided along a radius thereof which is parallel to the bottom wall portion of the formed pockets.

In order to obtain uniformity of grating strip fabrication, and to simplify assembly, the several wall portions preferably are of substantially equal lengths. Also, the interior angles of each pocket, formed at the junction between a side wall portion and a bottom wall portion, are uniformly equal. Preferably, in order to provide grating cells which are of regular, hexagonal form, the interior angles of each pocket should be 120° angles.

As is indicated by the showing of FIG. 1, the bottom and side wall portions of each grating element pocket, and of each grating cell, are inclined at an angle to the focal axis of the radii thereof and to parallel planes respectively including the edge portions of said elements. The angle of inclination of each wall portion is substantially equal, but opposite from one wall portion to the next. When assembled in a structure as illustrated by FIG. 1, the opposite wall portions of each grating cell are parallel and similarly inclined with referenec to the focal axis of that cell.

These structural characteristics of the grating cells according to the present invention are obtained by the manner of deformation of the individual grating strip elements, and the manner of assembly of the deformed strips to accomplish the grating structure. In FIG. 2, a portion of a typical grating strip element, such as the element 1 of FIG. 1, is shown prior to deformation. Such a strip may be of any desired width, dependent upon the desired depth of a cementitious liner or coating to be supported and reinforced thereby. A typical strip might be from about two to about four inches wide. The length of such a strip is determined, primarily, by facility of handling during deformation to fabricate the pockets, and by the dimensions of the vessel in which the finished grating structure is to be employed. Usually, smaller strip and smaller cell sizes will be employed for small vessels.

In FIG. 2, the strip element shown is also designated by the numeral 1 for direct relation to the typical element of FIG. 1. The letters $w$, $x$, $y$, and $z$ applied to the strip of FIG. 2 designate lines of definition for deformation of the strip to provide the series of previously indicated pockets and pocket defining wall portions of the element 1 of FIG. 1. Likewise, the areas of the wall portions resulting from such deformation are designated by the same numerals as the respective pocket wall portions in FIG. 1. In each strip, the lines of definition are in repetitive series, with each line $w$ succeeding a line $z$ in a preceding series.

To provide a regular hexagon cell pattern in an assembled grating structure, and to accomplish the purposes of the present invention, the lines of deformation are arranged and disposed in pairs extending substantially laterally of the strip, from one longitudinal edge portion to the other, in equi-angular divergent relation, and from pair to pair extending from alternate edge portions. Thus, the lines of definition $w$ and $x$ diverge equi-angularly from one strip edge, while the lines of deformation $y$ and $z$ diverge likewise from the opposite edge portion. Also, in order to provide a regular cell pattern, the distance between the lines of each pair is uniform and equal from pair to pair. In addition, adjoining lines from pair to pair are parallel, and preferably are spaced at a distance which is equal to the least distance between adjoining lines of any divergent pair. Thus, in divergent pairs of lines $w$—$x$, and $y$—$z$, lines $w$ and $x$ are parallel respectively to lines $z$ and $y$ of adjoining line pairs, and are spaced respectively from lines $z$ and $y$ by the least distance between each divergent pair of lines. As indicated in FIG. 2 above, the numerals 3b, 5b, 7b, and 9b, and 3a, 5a, 7a, and 9a designate the strip areas corresponding to the resulting wall portions so designated in the structure of FIG. 1. These wall portions and the pockets defined thereby are then produced by bending the strip 1 along the lines of definition through an angle of 240°, initially from the flat surface of the strip and subsequently in an opposite direction from the angle of the strip formed by the initial or any subsequent bend. Also, in order that the junctions between strips in the same course, and having aligned longitudinal axes, may be most conveniently joined one to another, and that parallel strips may be most conveniently joined, it is preferred that the lines of definition on each strip start and end with the lines designated by the letters $z$ and $w$, and with these lines spaced from the respective end portions of the strip by one half the least distance established for the spacing of paired, divergent lines. For the same reason it is preferred that, for a regular hexagonal grating cell pattern, the length of each strip should be determined at least by a distance equal to a multiple of twice the least distance between a pair of divergent definition lines, and with any increase in length beyond the determined least distance proceeding by arithmetical progression. In this way, joints between strip elements and between parallel rows of strip elements may be accomplished between wall surface portions in one row which are respectively in end to end abutment and also in parallel surface contact with an adjoining row.

The strip 1 of FIG. 2, corresponding to the strip 1 of FIG. 1, when deformed in the manner described, will have an appearance in elevation substantially as illustrated by the section taken along the line III—III of FIG. 1, and as illustrated by FIG. 3. Also when a series of strips are assembled to form a grating structure as shown in FIG. 1, an elevational view taken along the line IV—IV of FIG. 1 will show, a pocket conformation substantially as shown by FIG. 4.

In assembling a plurality of grating strip elements deformed in the manner described with reference to FIG. 2, in order to fabricate a support and reinforcement structure as shown by FIG. 1, these elements are disposed in serially aligned rows with the elements in parallel rows disposed with parallel and oppositely divergent pocket bottom wall surface portions such as 3a, 5a, 7a, 9a, and 4a, 6a, 8a, and 10a respectively in alternate oppositely spaced and juxtaposed relation. As thus disposed, the side wall surface portions 3b, 5b, 7b, and 9b, will be in opposite, parallel, spaced relation to wall surface portions 6b, 4b, 10b, and 8b respectively. If the initial dimension of the strip elements is equal to twice the least distance between two divergent lines of definition, the abutting juncture between aligned elements and surface juncture of juxtaposed elements will coincide.

A plurality of grating structure units assembled in the manner disclosed may be rolled or otherwise shaped to conform with the inner surfaces of a vessel to which they are to be applied. They may be applied to and mounted on such surfaces in any conventional fashion to provide a superimposed supplemental structure, wherein the grating cells face inwardly toward the axis of the vessel and outwardly toward the walls thereof. Preferably, this grating structure is supported in spaced relation to the inner wall surfaces. Assembly of units fabricated as described is facilitated by uniformity of the elements from which fabricated.

After attachment of the units to the vessel wall, a cementitious liner material is applied to fill the cells and any space between the grating and the wall surfaces. When thus filled, displacement of the liner material is inhibited by the keying action afforded by the matched inclination of opposed wall portions in each cell. In a regular hexagonal cell, according to the present invention, the angular wall portions are oppositely inclined to the intermediate bottom wall portions in each half cell or pocket. Also, in each cell, adjoining angular wall portions are oppositely inclined. Thus, in each cell, any two non-adjoining wall portions are inclined in the same direction and spaced one from another by an oppositely inclined wall element, and on all sides of the cell axial displacement of the cementitious liner or cell filler is resisted by the opposed inclination of adjoining cell walls.

Utilizing the concepts and principles of construction and assembly as set forth above, grating structures of other geometric conformations may be devised and produced. The invention is set forth and described, however, with reference to a preferred, regular hexagonal, cellular pattern.

What is claimed is:

A method of making a support and reinforcement structure essentially consisting of a plurality of initially flat grating strip elements each having obverse and reverse surface portions and substantially parallel edge portions longitudinally thereof, said method comprising the steps of angularly deforming each of said strip elements uniformly along lines of deformation arranged in spaced relation longitudinally of said strip elements to extend substantially laterally thereof in pairs originating alternately from opposite edge portions, with the lines of each pair of lines in equiangular divergent relation and with adjacent lines from pair to pair in parallel relation to each other, to provide a series of pockets wherein one wall portion is defined between a divergent pair of said lines and is connected to and spaced from a similarly defined wall portion by a wall portion defined between said lines in parallel relation; arranging said strip elements in substantially parallel, juxtaposed disposition to bring only every second one of said wall surface portions defined between a divergent pair of said lines on any first given strip element into substantially coincident contacting relation with a similar wall surface portion of a second given strip element immediately adjacent said first given strip element to define a multiplicity of hexagonal grating cells intermediate said first and second strip elements, and joining said strip elements along said contactingly related wall surface portions, said joining being effected essentially by welding.

References Cited in the file of this patent

UNITED STATES PATENTS

| | | |
|---|---|---|
| 1,982,110 | Keown | Nov. 27, 1934 |
| 2,015,897 | Higley | Oct. 1, 1935 |

FOREIGN PATENTS

| | | |
|---|---|---|
| 752,874 | Great Britain | July 18, 1956 |